3,004,211
Patented Oct. 10, 1961

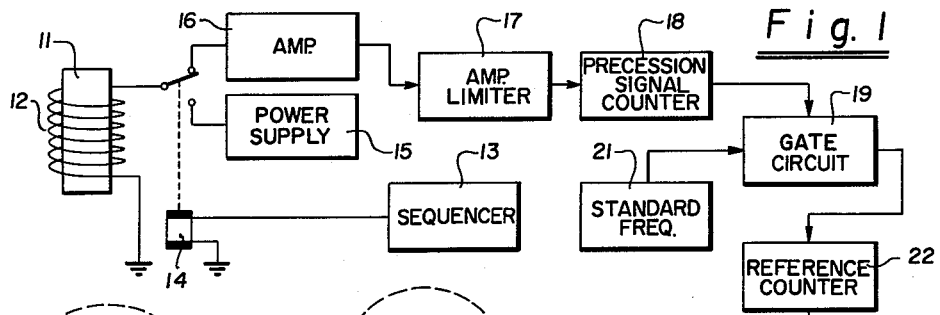
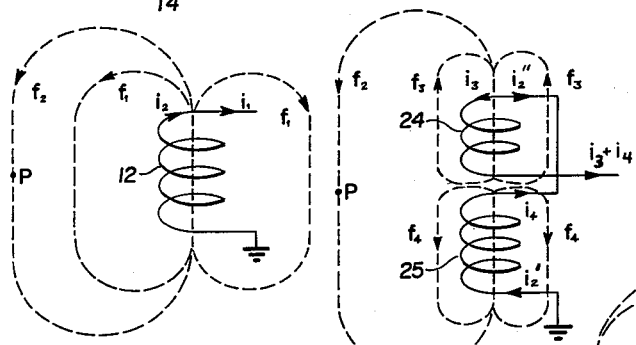
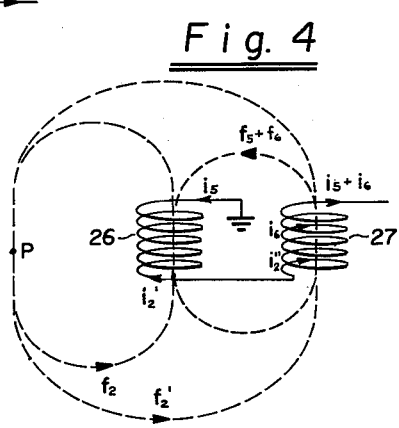
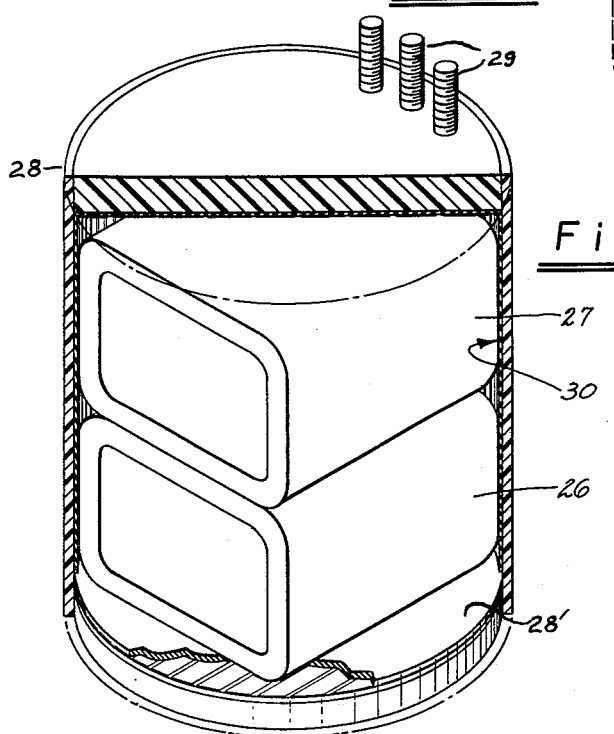
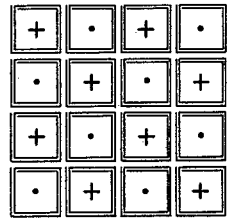
Fig. 1
Fig. 2
Fig. 3
Fig. 4
Fig. 5
Fig. 6
INVENTOR
WESTON A. ANDERSON
JOHN M. MATHIAS
BY
ATTORNEY ![United States Patent Office]

3,004,211
ATOMIC PRECESSION MAGNETOMETERS
Weston A. Anderson, Palo Alto, and John M. Mathias, Woodside, Calif., assignors to Varian Associates, Palo Alto, Calif., a corporation of California
Filed Oct. 14, 1957, Ser. No. 689,937
15 Claims. (Cl. 324—.5)

This invention relates in general to magnetic field measuring apparatus and more particularly to novel improvements in magnetometer apparatus which utilizes the principle of precession of atom portions such as nuclei in unknown magnetic fields for accurately determining the strength of the magnetic field.

The technique of measuring magnetic field strengths by means of the precession of atom portions possessing the properties of magnetic moment and gyroscopic moment, such as nuclei, is first explained in U.S. Patent Re. 23,769 issued to Russell H. Varian on January 12, 1954, entitled "Method and Means for Correlating Nuclear Properties of Atoms and Magnetic Fields." In a nuclear free precession magnetometer of present design the nuclei utilized are protons in a sample of water or kerosene, for example. The sensing head which includes the sample is placed in the magnetic field which one desires to measure, for example, the earth's magnetic field, and a strong polarizing magnetic field $H_0$ is applied to the protons by means of a coil surrounding the sample material to polarize the proton magnetic moments $M_0$ substantially at right angles to the earth's magnetic field. This polarizing magnetic field is applied sufficiently long to align the nuclear magnetic moments, for example, three seconds, and is suddenly turned off with the result that the nuclear magnetic moments are left substantially perpendicular or at least at some substantial angle relative to the direction of the earth's magnetic field and are free to precess about the direction of the earth's magnetic field at the Larmor frequency of the nuclei. This Larmor frequency is given by the equation $\omega = \gamma_p \times H$ where H is the earth's field strength and $\gamma_p$ is a constant referred to as the gyromagnetic ratio of the nuclei. Since the gyromagnetic ratio is an accurately fixed constant, the frequency of the precession is directly proportional to the strength of the earth's magnetic field.

The precessing magnetic moments induce a voltage in a pick-up coil surrounding the water, in some cases a separate pick-up coil positioned approximately at right angles to the earth's field and to the polarizing field but in most instances of use the same coil that was used for polarizing. The frequency of the detected signal is accurately measured, and in accordance with the above equation, the magnitude of the earth's magnetic field determined. Using protons, the Larmor frequency corresponding to the earth's magnetic field (.5 gauss) is about 2 kilocycles. The system is highly accurate because the precession or Larmor frequency will depend only on the strength of the earth's magnetic field and the constant $\gamma_p$. For protons in water $\gamma_p$ has been measured to an absolute accuracy of about 1 in 40,000. Relative measurements can be even more accurate and will be limited only by the fundamental conditions of the apparatus.

The voltage induced in the pick-up coil due to the precessing nuclear magnetic moments is at a maximum amplitude immediately after the polarizing magnetic field is removed and decays rapidly thereafter as the nuclei precess less and less coherently in the earth's magnetic field. Since this period of reception is short, the signal received must be of optimum amplitude and free from disturbances if its frequency is to be accurately determined. It has been found in prior systems that any slight magnetic field disturbance occurring in the vicinity of the pick-up coil will be detected by the pick-up coil and will seriously affect the reception of the magnetic field produced by the precessing magnetic moments. Ordinarily such magnetic field disturbances appear as random noise on the free precession signal and in many cases mask the free precession signal which one is seeking to obtain.

The present invention provides a novel pick-up coil for utilization in free precession magnetometers which substantially eliminates the deleterious effect on free precession signals caused by extraneous and random magnetic field disturbances in the vicinity of the pick-up coil. To accomplish this in one embodiment of the present invention a plurality of coils, for example two, are utilized in combination to detect a free precession signal, the coils being electrically interconnected and physically arranged such that the currents induced in the separate coils due to extraneous magnetic field disturbances mutually cancel out while the currents induced due to the free precession magnetic field are additive to produce the maximum, noise free signal.

Other magnetometer devices utilizing the precession of atom portions in magnetic fields differing from the above described free-precession magnetometer, such as, for example, those in which the atom portions are aligned by saturation techniques rather than a strong polarizing magnetic field, may also utilize the present invention.

It is, therefore, the principal object of the present invention to provide a novel pick-up coil construction for utilization in magnetometers of the precessing atom portion type.

One feature of the present invention is the provision of a plurality of separate coils or coil sections electrically connected and physically arranged to serve as a single pick-up coil for a precession type magnetometer, the separate coils being arranged such that electrical currents induced in the coils due to external magnetic field disturbances cancel out in the coils while currents induced due to the precession magnetic field are additive.

Another feature of the present invention is the provision of a pick-up coil of the above featured type in which the coils are similar in size and shape and are connected in an electrical series-bucking manner, the coils being spaced apart with their axes in alignment.

Still another feature of the present invention is the provision of a novel pick-up coil construction of the first above-featured type wherein the coils are connected in series-bucking fashion, the coils being positioned side by side such that their axes are parallel but not coinciding and such that their magnetic moments are in opposite directions.

These and other features and advantages of the present invention will be more apparent after a perusal of the following specification taken in connection with the drawings wherein, FIG. 1 is a block diagram showing a typical type of free precession magnetometer system which, in this instance, utilizes a single coil in the sensing head for producing a strong polarizing field and for subsequently detecting the magnetic field produced by the freely precessing protons, FIG. 2 is a diagrammatic sketch of the coil in the sensing head of FIG. 1 showing the field lines produced by the precessing nuclei and the field lines produced by external magnetic field disturbances.

FIG. 3 is a diagrammatic illustration of one embodiment of the present invention showing a new and novel coil construction utilized for the pick-up coil and illustrating the magnetic fields produced by the precessing atom portions and also the magnetic fields produced by external field disturbances, FIG. 4 shows another embodiment of the present invention in which the coil construction includes two coils substantially square in configuration and mounted side by side, FIG. 5 is a perspective view, partly in section, of one particular construction of a sensing head incorporating the present invention, and FIG. 6 shows another embodiment of the invention which utilizes sixteen coil sections making up the sensing head coil.

Referring now to FIG. 1 there is shown in block diagram a basic nuclear free precession magnetometer system. A sample of water is sealed in a plastic container 11 which has a coil of wire 12 axially wound about it. Typically, the coil is constructed so as to carry a D.C. current of about 6 amps. and produce a polarizing magnetic field of about 100 gauss within the coil. A sequencer 13 automatically operates to pulse a relay 14 which, in its operated position, couples the sensing coil 12 to a D.C. power supply 15 and, in its released position, couples the sensing coil 12 to the free precession counter system. The sequencer typically operates to couple the coil 12 to the power supply for approximately 3 seconds and then to the counting circuit for approximately 2 seconds. During the period of time when the coil 12 is connected to the power supply 15, a polarizing magnetic field is produced by the coil to align the magnetic moments of the protons in the water in the direction of the polarizing magnetic field which is at a substantial angle to the direction of the field to be measured, preferably normal thereto. On disconnect of the coil 12 from the power supply 15, the polarizing field quickly decaps and leaves the aligned magnetic moments to precess in the earth's magnetic field. The precessing magnetic moments induce an alternating current in the sensing coil 12, this alternating frequency signal being transmitted through an amplifier 16 and through a pulse shaping amplitude limiter 17 to a precession signal counter 18 which, in most instances of use, is a binary counter system operating to count a fixed number of cycles of the free precession signal. On initiation of the count of the first cycle by counter 18, a gate circuit 19 operates to close the circuit from a standard frequency source 21 to a reference counter 22. This standard frequency source may be, for example, a 100 kilocycle crystal controlled oscillator and the reference counter a second binary counter chain for counting the cycles from the standard frequency counter. A predetermined number of cycles is counted in the precession signal counter 18, for example, 2,000 cycles, and in response to the last cycle of this count the gate circuit 19 is operated to open the circuit from the standard frequency source 21 to the reference counter 22. As the frequency of the free precession signal increases or decreases with magnetic field strength, the time duration of the gate decreases or increases, respectively. The number of cycles from the standard frequency source 21 counted by the counter 22 during the gate period is a precise measurement of the gate time and thus a highly accurate measurement of the frequency of the free precession signal, and thus the magnetic field strength can be accurately determined. At the end of the time gate counting interval, a voltage proportional to the number of crystal controlled pulses counted by counter 22 is fed to a graphic recorded 23 or the like where a record is made in field strength readings.

FIG. 2 shows the pick-up coil 12 and depicts the magnetic field lines $f_1$ produced by the precessing magnetic moments at a certain instant of time. The induced current $i_1$ produced by the field $f_1$ is also shown. Of course, both the field $f_1$ and the current $i_1$ are alternating and are therefore reversed in the next instant of time. A magnetic field disturbance at a point P produces a magnetic field represented by line $f_2$ and this field disturbance induces a current $i_2$ in the coil 12 which may add to or subtract from the current $i_1$ produced by the precessing atom portions. This spurious and random magnetic field disturbance may seriously affect the free precession signal $i_1$. At times the disturbance may be sufficient to completely mask the signal $i_1$.

There is shown in FIG. 3 one embodiment of the present invention for eliminating the effect of random external magnetic field disturbances in which two coil sections 24 and 25 are utilized for the pick-up coil and are connected in series opposition. The proton magnetic moments within the two coil sections are aligned, during polarization, in opposite directions due to the series bucking interconnection of the coil sections. The alternating field lines $f_3$ due to the precessing magnetic moments within the upper coil section 24 and the resultant induced current $i_3$ are shown and similar field lines $f_4$ and current $i_4$ for the lower coil section 25 are also shown. It is noted that the current $i_3$ is traveling in the same direction through the coil wire as the current $i_4$ and thus the currents induced by the precessing nuclei in the two coil sections are additive to give the output current $i_3+i_4$. The external magnetic field disturbance at point P represented by field line $f_2$ produces currents $i_2'$ and $i_2''$ in the lower and upper coil sections, respectively. The current $i_2'$ in the lower section 25 opposes the current $i_2''$ in the upper section 24 and thus the currents mutually cancel and the effect of the magnetic disturbance at point P is eliminated. The aligned coil sections 24 and 25 are spaced apart so that the magnetic field lines $f_3$ and $f_4$ for each of the separate coils may pass around the coils within the gap. Due to this physical arrangement there is a negative mutual inductive coupling between these two coil sections.

Referring to FIG. 4 there is shown another embodiment of this invention for eliminating the effect of random external magnetic field disturbances which is preferable to the embodiment shown in FIG. 3. Two similar coil sections 26 and 27 are placed side-by-side and electrically interconnected so that the magnetic moments of the coil sections are in opposite directions. Thus the polarizing magnetic fields set up by the coil sections 26 and 27 due to the D.C. current flow therein extend in opposite directions. The alternating fields produced by the precessing proton magnetic moments within the coil sections 26 and 27 are represented by the magnetic field lines $f_5$ and $f_6$ which, due to the fact that the magnetic moments of the coil sections 26 and 27 extend in opposite directions, are additive and are shown as a resultant field line $f_5+f_6$. The current induced in coil section 26 due to field $f_5$ is represented as $i_5$ and that in section 27 due to field $f_6$ is represented as $i_6$. It is noted that these currents $i_5$ and $i_6$ are in the same direction in the coils and thus add in the output of these coil sections. The external magnetic field disturbance at point P represented by field lines $f_2$ produce currents $i_2'$ and $i_2''$ in coil sections 26 and 27, respectively. The current $i_2'$ in section 26 opposes the current $i_2''$ in section 27 and thus the currents due to the magnetic field disturbance mutually cancel and the effect of the magnetic disturbance at point P is eliminated. Due to the side-by-side physical arrangement of the two coils and their interconnection such that their magnetic moments extend in opposite directions, a positive mutual inductive coupling exists between the two coil sections. The coupling is enhanced by utilizing rectangular-shaped coils and thus increasing the Q and filling factor.

The arrangement of FIG. 4 is preferable to the coil arrangement of FIG. 3 since in FIG. 4 a larger number of the proton magnetic moments within each separate coil section are aligned in the same direction than in the arrangement of FIG. 3 and thus more proton magnetic moments contribute to the induced signal in the respective coil section. In the arrangement of FIG. 3 the protons near the ends of the coil sections adjacent the gap between the two coil sections come under the influence of magnetic fields which are fringing out from the axial direction and thus these proton magnetic moments become aligned at an angle, sometimes normal, with respect to the direction of alignment of the magnetic moments within the center of the coil lengths. Thus these fringe proton magnetic moments do not contribute to the signal within the coil sections as do the proton magnetic moments near the ends of the coil sections in FIG. 4.

A typical magnetometer sensing head incorporating the pick-up coil arrangement in accordance with FIG. 4 is shown in FIG. 5. Each section of coil consists of about 386 turns of number 16 insulated copper wire adapted to carry a current of about 6 amps. and thus produce a polarizing magnetic field of about 100 gauss within each coil section. The coil section length is about 6 inches and the inside measurements of the coil are 3½" by 1⅞". The coils are cemented side-by-side as shown and are electrically connected in series opposition as described above. They are placed in a liquid-tight phenolic hollow cylinder 28 which, in addition to the coil sections, contains about 1.7 liters of kerosene. An electrostatic shield 30 is secured on the inside of the cylinder and a cushioned flooring 28' as of cork is provided. Connection terminals 29 extend from the cylinder for making electrical connections with the ends of the coil sections and for making a ground connection with the electrostatic shield.

Referring to FIG. 6 there is shown another embodiment of the present invention in which sixteen coil sections are utilized, alternate ones of the coil sections being connected in series-bucking fashion such that the magnetic moments of alternate ones of the coil sections extend in opposite directions as indicated by the dots and crosses in the coil sections. The advantage to be gained from utilizing a larger plurality of coil sections than shown in FIG. 4 lies in the fact that a finer degree of cancelling of currents in the coils induced by extraneous magnetic fields may be accomplished since the axes of the different coils are more equally spaced from any point external to the coil sections. The coils are arranged in abutting fashion such that the mutual coupling between them is optimum.

It should be mentioned that the individual coil sections utilized in the present invention may be adjusted slightly as to size, shape, number of turns, etc. so that the magnetic moments of the individual coils are identical.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A magnetometer of the precessing atom portion type comprising a polarizing current source, an induced precession signal frequency counting circuit, an electrical coil means coupled to atom portions in a sample, and means for first coupling said coil means to said polarizing current source to polarize the atom portions at an angle to the direction of the magnetic field to be measured and for subsequently decoupling said coil means from said polarizing source and coupling said coil means to said frequency counting circuit for measuring the precession frequency, said electrical coil means including a plurality of coil sections with similar magnetic moments, said coil sections being electrically connected in series-bucking manner and having electrical terminals for connecting with the polarizing current source and the precession frequency counting circuitry, the coil sections having their axes extending in the same direction and positioned so the atom portions which are inductively coupled to the respective coil sections are polarized in opposite directions and the currents induced in the coil sections due to magnetic fields produced within the coil sections by the precessing magnetic moments of the atom portions in the sample within the coil sections are in the same direction and additive while currents induced in the coil sections due to magnetic fields outside the coil sections are in opposite directions in the coil sections and thus mutually cancel.

2. A magnetometer as claimed in claim 1 wherein said coil sections are in axial alignment with a gap between the opposing coil section ends, the magnetic moments of the coil sections being in opposite directions but in axial alignment.

3. A magnetometer as claimed in claim 1 wherein said coil sections are positioned side-by-side, the magnetic moments of adjacent coil sections being in spaced-apart parallelism and extending in opposite directions.

4. A magnetometer as claimed in claim 3 wherein said coil sections have a rectangular-shaped cross section with the sides of the coil sections abutting whereby the mutual inductive coupling between the coil sections is at a maximum.

5. A magnetometer of the precessing atom portion type comprising a polarizing current source, an induced precession signal frequency counting circuit, a casing of insulating material containing a sample with gyromagnetic atom portions therein, an electrical coil means within said casing coupled to the atom portions in said sample, and means for first coupling said coil means to said polarizing current source to polarize the atom portions at an angle to the direction of the magnetic field to be measured and for subsequently decoupling said coil means from said polarizing source and coupling said coil means to said frequency counting circuit for measuring the precession frequency, said electrical coil means including a plurality of coil sections with similar magnetic moments, said coil sections being electrically connected in series bucking manner, the coil sections having their axes extending in the same direction and positioned so the atom portions which are inductively coupled to the respective coil sections are polarized in opposite directions and the currents induced in the coil sections due to magnetic fields produced within the coil sections by the precessing magnetic moments of the atom portions in the liquid within the coil sections are in the same direction and additive at the outside terminals while currents induced in the coil sections due to magnetic fields outside the coil sections are in opposite directions and thus mutually cancel.

6. A magnetometer as claimed in claim 5 wherein an electrostatic shield is located within the casing around the coil sections and connects with a terminal extending outside of the casing.

7. A magnetometer as claimed in claim 5 wherein said coil sections are in axial alignment with a gap between the opposing coil section ends, the magnetic moments of the coil sections being in opposite directions but in axial alignment.

8. A magnetometer sensing head as claimed in claim 5 wherein said coil sections are positioned side-by-side, the magnetic moments of the coil sections being in spaced apart parallelism and extending in opposite directions.

9. A magnetometer as claimed in claim 8 wherein said coil sections have a rectangular-shaped cross-section with the sides of the coil sections abutting whereby the mutual inductive coupling between the coil sections is at a maximum.

10. A magnetometer of the precessing atom portion type in which the magnetic moments precess at a frequency dependent on the strength of the magnetic field to be measured and induce a signal in a pick-up coil, comprising an electrical pick-up coil inductively coupled to a sample containing the atom portions, a precession counting circuit adapted to be coupled to said coil to measure the precession frequency of the induced signal, said electrical coil comprising a plurality of coil sections with similar magnetic moments, said coil sections being electrically connected in series-bucking manner and having their axes extending in the same direction such that the magnetic moments of the coil sections are in opposite directions, and means for polarizing the atom portions inductively coupled to the respective coil sections in opposite directions, whereby the currents induced in the coil sections due to magnetic fields produced within the coil sections by the precessing magnetic moments of the atom portions in the sample within the coil sections are in the same direction and additive while currents induced in the coil sections due to magnetic fields outside the coil sections are in opposite directions and thus mutually cancel.

11. A magnetometer of the atomic free precession type for measuring magnetic fields wherein the magnetic moments of the atom portions are aligned at an angle with respect to the magnetic field to be measured and then permitted to precess at their Larmor frequency in said magnetic field and induce a signal in a pick-up coil coupled to the sample, said signal being amplified and the frequency thereof measured in frequency measuring circuitry coupled to the coil to determine the strength of the magnetic field, comprising a pick-up coil inductively coupled to a sample containing the atom portions, said coil being made up of a plurality of coil sections having substantially similar magnetic moments, a precession counting circuit adapted to be coupled to said pick-up coil to measure the precession frequency of the induced signal, the coil sections being electrically connected in a series-bucking manner and having their axes extending in the same direction, such that the magnetic moments of the coil sections are in opposite directions, and means for aligning the atom portions inductively coupled to the respective coil sections in opposite directions, whereby the currents induced in the coil sections due to the magnetic fields produced within the coil sections by the precessing magnetic moments of the atom portions in the sample are in the same direction and additive while currents induced in the coil sections due to magnetic fields outside the coil sections are in opposite directions and thus mutually cancel.

12. A magnetometer as claimed in claim 11 wherein said coil sections are in axial alignment.

13. A magnetometer as claimed in claim 12 wherein said axially aligned coil sections have a small gap between the opposing coil section ends.

14. A magnetometer as claimed in claim 11 wherein said coil sections are positioned side by side by side, the magnetic moments of adjacent coil sections being in spaced apart parallelism and extending in opposite directions.

15. A magnetometer as claimed in claim 14 wherein said coil sections have a rectangular-shaped cross section with the sides of the coil sections abutting whereby the mutual inductive coupling between the coil sections is at a maximum.

References Cited in the file of this patent
UNITED STATES PATENTS

Re. 23,769     Varian _____ Jan. 12, 1954

FOREIGN PATENTS 163,872     Australia _____ July 5, 1955
746,114     Great Britain _____ Mar. 7, 1956